Patented Nov. 28, 1939

2,181,664

UNITED STATES PATENT OFFICE 2,181,664

ELECTRICAL BUS SYSTEM

Jacob M. Melzer, Southwest Greensburg, Pa., assignor to Railway and Industrial Engineering Company, Greensburg, Pa., a corporation of Delaware Application October 4, 1938, Serial No. 233,317

5 Claims. (Cl. 174—99)

This invention relates to electrical bus systems and particularly to bus systems in which each bus or conductor is separately enclosed in a non-magnetic duct or housing.

It has been proposed, as described and claimed in the copending application of Harold H. Rudd, "Electrical bus systems," Serial No. 167,639, filed October 6, 1937, to support each bus and its housing by annular insulator frames which each carry a plurality of radially disposed insulators and which have annular flanges for supporting the plates forming the bus duct. The present invention relates to constructions of that general type.

An object of the invention is to provide enclosed bus systems of simpler and less expensive design for use where the maximum mechanical protection against damage from high short circuit stresses is not essential. An object is to provide an enclosed bus system in which the bus supports comprise bases having flanges conforming to sectors of a cylinder, and straps or bands are secured to the bases to complete annular flanges for supporting the duct plates. An object is to provide a bus system including ring frames for carrying the duct plates, each frame including a base for attachment to a support, and a strap or band secured to the base; the bus being supported by the base. More specifically, an object is to provide a bus system including supporting bases which each carry an insulator and have a flange forming a sector of a cylinder, straps secured to the bases to complete the cylindrical surface of an annular frame, and duct-forming plates clamped to the annular frames.

These and other objects and advantages of the invention will be apparent from the following specification when taken with the accompanying drawing in which.

Figure 1:
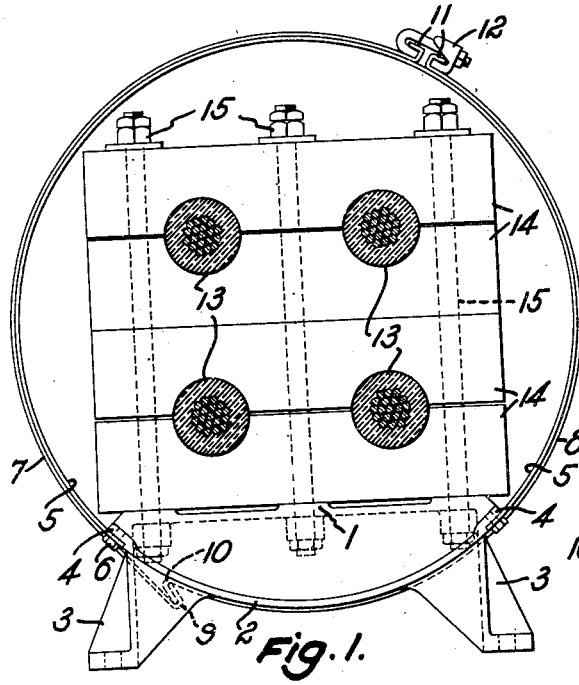
Fig. 1 is an end elevation of one embodiment of the bus support and housing contemplated by this invention.
Figure 2:
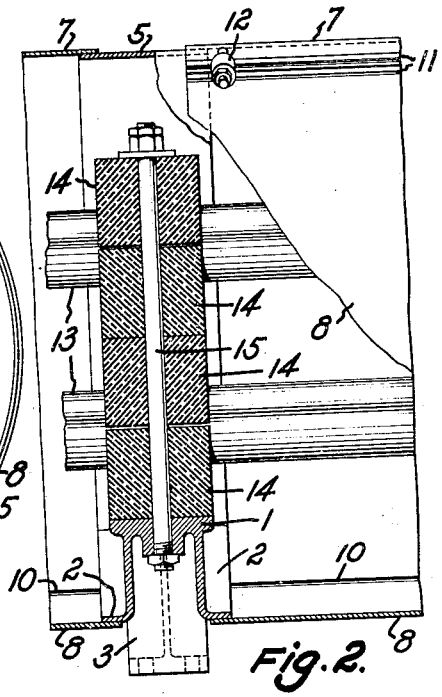
Fig. 2 is a fragmentary central section, with parts shown in elevation, of the same.

In the drawing, the reference numeral 1 identifies the interior or insulator supporting section of a frame having sector-shaped cylindrical flanges 2 and legs 3 for securing the base to a support. The ends 4 of the flanges are notched to form seats for the ends of the strap or band 5 that is secured to the flange ends 4 by bolts 6. The strap 5 is relatively thin and its outer surface merges into that of the flanges 2 and cooperates with the flanges 2 to form a ring or annular support for the ends of the duct-forming plates 7, 8.

The plates 7, 8 are semi-cylindrical with one set of flanged edges 9, 10, respectively, that engage to anchor the plates to each other and a second set of reversely bent flanges 11 for receiving clamp bolts 12 by which the plates are clamped to each other and to the flange members 2, 5. The duct thus formed is not airtight as the flanges 11 cannot be drawn tightly to each other and also securely anchored to the frames when they are made with the usual manufacturing tolerances.

The illustrated bus is of the quadruple cable type, the cable 13 being carried in mating notches in the insulator blocks 14 that are mounted on the section 1 of the base by bolts 15. Other types of bus members, such as the tubular, plate or channel types, may be supported from the bases by insulator constructions such as shown in Fig. 3.

Figure 3:
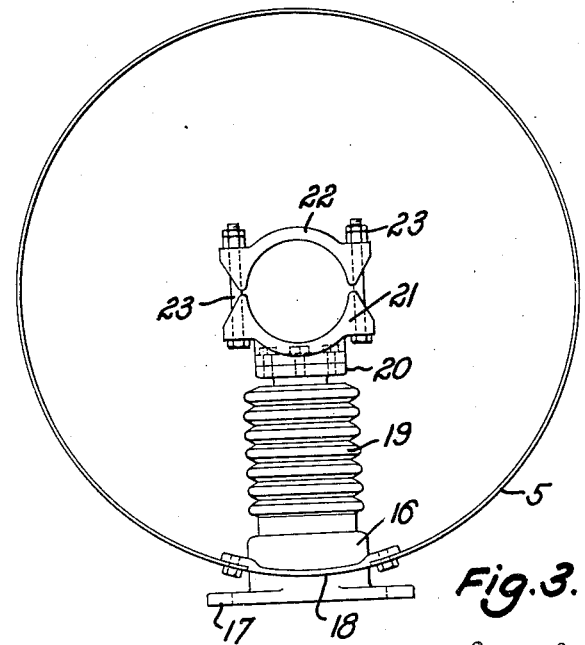
Fig. 3 is an end elevation of another form of supporting structure.

The insulator base of Fig. 3 includes a central pillar section 16 having an attaching flange 17 and a lateral sector-shaped flange 18 for receiving the strap 5. The cylindrical insulator 19 is secured to the base by cement or die metal in the usual manner and carries the metal head 20 to which the base member 21 of the bus clamp is bolted. The upper member 22 is secured to the lower clamp member by bolts 23. The illustrated clamps are shaped to receive a bare or taped bus of tubular form but may be given other shapes in accordance with the design of the bus members of the particular installation.

The base members, straps and duct plates are non-magnetic. The frames may be of cast bronze or aluminum, and the straps and duct plates may be of non-magnetic steel or aluminum. The straps of the frames are not subjected to stresses by short circuit current surges and may therefore be relatively light or flexible and, in general, of a thickness comparable to that of the duct plates. The cylindrical duct form affords a relatively rigid structure from thin straps and plates since the pressure applied by clamps 12 tends to preserve the normal cylindrical shape of the duct.

It is to be understood that there is considerable latitude in the design of bus systems set forth in the following claims, and that the invention is not restricted to the specific constructions herein shown and described.

I claim:

1. In an electrical bus system, a bus, insulator means carrying said bus, a base supporting said insulator means and having a flange conforming to a sector of a cylindrical surface, a strap secured to said flange to complete the cylindrical surface, and duct plates clamped to each other and to said cylindrical surface to form a duct enclosing said bus.

2. In an electrical bus system, a base member having a flange for attachment to a support and a flange conforming to a sector of a cylindrical surface, the ends of said sector-shaped flange being notched, a strap having its ends seated in said notches and cooperating with said sector-shaped flange to define a cylindrical surface, insulator means secured to said base, a bus supported by said insulator means, duct plates, and means clamping said duct plates to each other and to said cylindrical surface.

3. The invention as claimed in claim 2, wherein said insulator means comprises a plurality of insulator members.

4. The invention as claimed in claim 2, wherein said insulator means consists of a cylindrical insulator, in combination with clamps carried by said insulator to support a bus.

5. In an enclosed bus system, a cast base member having a flange conforming to a sector of a cylindrical surface, insulator means on said base, a bus carried by said insulator means, and a flexible strap secured to said base and cooperating with said flange to provide a cylindrical surface to which plates may be secured to form a duct enclosing said bus.

JACOB M. MELZER.